(12) United States Patent (10) Patent No.: US 9,419,452 B2
Toivanen et al. (45) Date of Patent: Aug. 16, 2016

(54) CHARGING CONNECTOR OVERHEAT DETECTION AND PROTECTION APPARATUS

(71) Applicant: Nokia Corporation, Espoo (FI)

(72) Inventors: Timo Juhani Toivanen, Mäntsälä (FI); Jarmo Ilkka Saari, Turku (FI); Pekka Eerikki Leinonen, Turku (FI); Pasi Markus Koskinen, Paimio (FI)

(73) Assignee: Nokia Technologies Oy, Espoo (FI)

( * ) Notice: Subject to any disclaimer, the term of this patent is extended or adjusted under 35 U.S.C. 154(b) by 189 days.

(21) Appl. No.: 13/967,197

(22) Filed: Aug. 14, 2013

(65) Prior Publication Data

US 2015/0048804 A1 Feb. 19, 2015

(51) Int. Cl.
   *H02J 7/36* (2006.01)
   *H02J 7/00* (2006.01)
   *G06F 1/20* (2006.01)
   *G06F 1/26* (2006.01)

(52) U.S. Cl.
   CPC .............. *H02J 7/0036* (2013.01); *G06F 1/206* (2013.01); *G06F 1/266* (2013.01); *H02J 7/007* (2013.01); *G06F 1/263* (2013.01); *H02J 2007/0062* (2013.01)

(58) Field of Classification Search
   CPC ..................................... H02J 7/0036
   USPC ........................................ 320/162
   See application file for complete search history.

(56) References Cited

U.S. PATENT DOCUMENTS

| 6,025,698 A | * | 2/2000 | Kim ................. G06F 1/263 320/132 |
| 6,211,649 B1 | | 4/2001 | Matsuda |
| 8,339,760 B2 | | 12/2012 | Rabu et al. |

(Continued)

FOREIGN PATENT DOCUMENTS

| CN | 201167239 Y | 12/2008 |
| CN | 101373893 A | 2/2009 |

(Continued)

OTHER PUBLICATIONS

Extended European Search Report received for corresponding European Patent Application No. 14177746.6, dated Jan. 30, 2015, 4 pages.
Office action received for corresponding Chinese Patent Application No. 201410396493.5, dated Mar. 17, 2016, 5 pages of office action and no pages of office action translation available.

*Primary Examiner* — Thuan Do
(74) *Attorney, Agent, or Firm* — Nokia Technologies Oy

(57) ABSTRACT

The present invention provides an apparatus that includes a resistive control block (RCB) coupled to data lines of a universal serial bus (USB) connector charging port and is configured to change a level of resistance between the data lines. The apparatus further includes a sensing and adjustment block (SAB) that is configured to sense a predetermined level of overheating of the USB connector charging port and cause the RCB to increase the level of resistance resulting in the USB connector charging port to appear as a different type of port. In another embodiment, an apparatus includes a RCB and SAB. The RCB is coupled to an identification and ground lines of a USB connector and configured to change a level of resistance between them. The SAB is configured to sense a predetermine level of overheating of a USB connector and cause the RCB to decrease the level of resistance.

18 Claims, 11 Drawing Sheets

(56) References Cited

U.S. PATENT DOCUMENTS

| | | |
|---|---|---|
| 2009/0021217 A1* | 1/2009 | Nakazawa et al. ............ 320/134 |
| 2009/0027928 A1 | 1/2009 | Dong et al. |
| 2009/0051326 A1 | 2/2009 | Wang et al. |
| 2009/0189569 A1* | 7/2009 | Hsu et al. ...................... 320/160 |
| 2012/0008380 A1* | 1/2012 | El Baraji et al. .............. 365/158 |
| 2012/0274269 A1 | 11/2012 | Ohkuma |

FOREIGN PATENT DOCUMENTS

| | | |
|---|---|---|
| CN | 101499670 A | 8/2009 |
| CN | 103138119 A | 6/2013 |
| WO | 2014/087193 A1 | 6/2014 |

* cited by examiner

CHARGING CONNECTOR OVERHEAT DETECTION AND PROTECTION APPARATUS

TECHNICAL FIELD

This application is directed, in general, to an apparatus for a charging connector and, more specifically, to an apparatus for overheat detection and failure protection of a charging connector.

BACKGROUND

Mobile devices are required to perform more and more functions. As a result, the mobile devices have higher capacity batteries in order to have reasonable operating time. In order to charge the higher capacity batteries, larger charging currents are needed to keep the charging time reasonable. The popular charging interface for charging mobile devices is the Universal Serial Bus (USB) interface. More specifically, a micro USB interface in the mobile device. However, higher charging currents through a micro USB interface can have power dissipation problems due to the smaller interface and wear of cables and connectors.

SUMMARY OF SOME EMBODIMENTS OF THE INVENTION

One aspect of the present invention provides an apparatus that includes a resistive control block, coupled to a first data line and a second data line of a universal serial bus connector charging port. The resistive control block is configured to change a level of resistance between the first data line and the second data line. The apparatus further includes a sensing and adjustment block coupled to the universal serial bus connector charging port. The sensing and adjustment block is configured to sense a predetermined level of overheating of the universal serial bus connector charging port and cause the resistive control block to increase said level of resistance resulting in the universal serial bus connector charging port to appear as a different type of port.

Another aspect of the present invention provides an apparatus a resistive control block coupled to a ground line and an identification line of a universal serial bus connector of a portable device. The identification line is coupled to a universal serial bus controller of the portable device. The resistive control block is configured to change a level of resistance between the identification line and the ground line. The apparatus further includes a sensing and adjustment block coupled to the universal serial bus connector of the portable device and is configured to sense a predetermined level of overheating of the universal serial bus connector of the portable device. The sensing and adjustment block is further configured to cause the resistive control block to decrease the level of resistance between the identification line and the ground line to a predetermined level.

BRIEF DESCRIPTION OF THE FIGURES

Reference is now made to the following descriptions taken in conjunction with the accompanying drawings, in which.

DETAILED DESCRIPTION OF EMBODIMENTS OF THE INVENTION

Figure 1:
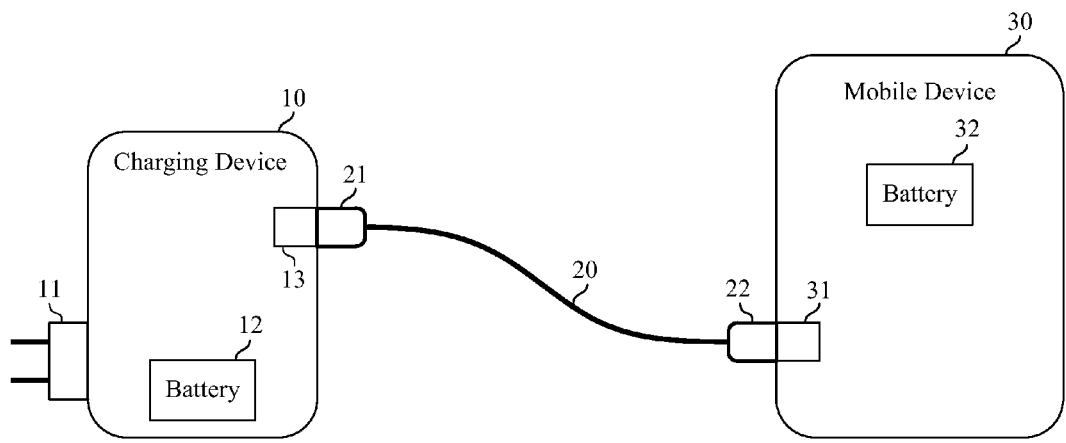
FIG. 1 is a block diagram of an example charging environment for mobile devices.

Referring initially to FIG. 1, illustrated is a block diagram of an example charging environment for mobile devices. The environment includes a charging device 10 that is capable of providing a charging current via a Universal Serial Bus ("USB") connector 13. The charging device 10 may have a power plug 11 to obtain power from a conventional power receptacle and use conventional components (not shown) to convert Alternating Current (AC) to Direct Current (DC) at a predetermined voltage that are suitable for charging a mobile device 30 via a conventional USB cable 20. In another embodiment, the power plug 11 may be a conventional DC power plug (not shown) that connects to conventional components (not shown) that converts incoming DC current and voltage to the appropriate DC current and voltage for charging the mobile device 30. The charging device 10, in one embodiment, may include a battery 12 that is used to provide a charging current in case there is no AC power available or the charging device 10 does not comprise a power plug. Examples of a charging device 10 include USB charger, desktop computers, and laptop computers.

The USB connector 13 of the charging device 10 is coupled to one end of the USB cable 20 via a compatible type USB connector 21. The other end of the USB cable 20 is coupled to a USB connector 31 of the mobile device 30 via a compatible type USB connector 22. When the USB cable 20 is coupled to the charging device 10 and mobile device 30, the USB connector 13 of the charging device 10 would appear as a charging port to the mobile device 30. Background information concerning USB port descriptions and charging via USB is described in the Battery Charging Specification, Revision 1.2, Dec. 7, 2010, and is hereby incorporated by reference in its entirety. In another embodiment, the USB connector 21 of the USB cable 20 and the USB connector 13 of the charging device 10 are combined into one connector that is not detachable from the charging device 10. In such an arrangement, the USB cable 20 may be called a captive cable.

The mobile device 30 is any portable device capable of receiving a charging current via the USB connector 31 and charge a battery 32 within or coupled to the mobile device 30 for example according to the Battery Charging Specifications listed above. Some examples of the mobile device 30 include portable phone, mp3 player, tablet, and personal game player.

Figure 2:
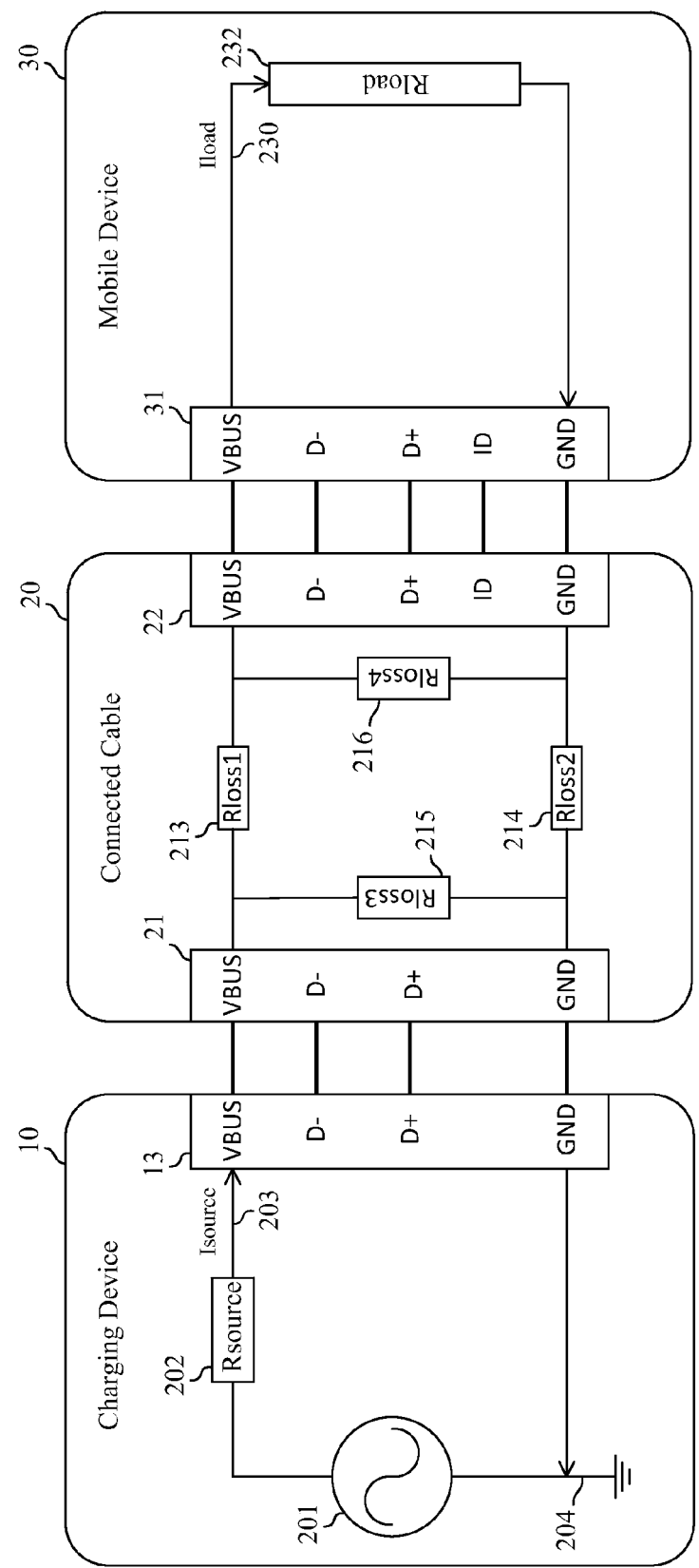
FIG. 2 is a block diagram of charging problems of the charging environment of FIG. 1.

Turning now to FIG. 2 with continued reference to FIG. 1, illustrated is a block diagram of charging problems of the charging environment of FIG. 1. In the environment illustrated, consumers want their mobile devices 30 to perform more and more functions and operate longer between charges. In order to achieve longer operating times given the increased usage, larger battery capacities are needed. This usually requires larger currents to charge the batteries within a reasonable time. One of the most popular interfaces used in charging is a USB interface that includes a standard USB cable 20. One such standard USB cable is a Micro USB cable, which is supported by a large number of mobile devices 30. Examples of mobile devices 30 that support Micro USB cables include mobile phones, tablets, mp3 players, and personal game players. However, USB cables can have problems when they are used for charging mobile devices.

USB connectors 13, 31 in conjunction with the USB cable 20 may have a problem with the various current levels used in charging the mobile device 30. In addition, the USB connectors 13, 31 and the USB cable 20 are sensitive to all unexpected ohmic losses during charging. Unexpected ohmic losses can occur from the USB connectors 13, 21, 22, 31 wearing or shorting, and from a broken, bent, or worn wire in the USB cable 20. The unexpected ohmic losses can cause increased power dissipation, which can lead to damage to the USB connectors, 13, 31, the USB cable 20, and to components in the charging device 10 and/or mobile device 30. If the power dissipation is severe, it could cause a safety hazard.

In the charging environment illustrated in FIG. 2, the charging device 10 has a voltage source 201 and a resistance associated with the charging device 10 called source resistance (Rsource) 202. The voltage source 201 in combination with the Rsource 202 produce a source current (Isource) 203 at a VBUS pin of the USB connector 13. When the USB cable 20 is connected between the charging device 10 and the mobile device 30, the Isource 203 flows through VBUS pins of the USB connectors 21, 22 of the USB cable 20 to a VBUS pin of the USB connector 31 of the mobile device 30. The current being consumed/used by the mobile device 30 is called a load current (Iload) 230. In addition, the components (not shown) of the mobile device 30 that are consuming/using the load current 230 have a resistance associated with them called Rload 232. The Rload 232 is coupled to the GND pin of the USB connector 31, which in turn is coupled to GND pins of the USB connectors 22, 21, 13 and to a ground 204 of the charging device 10 to complete the circuit.

The normal power dissipation of the charging device 10, USB cable 20, and mobile device 30, follows the formula $P=RI^2$. Where P is the power dissipation, R is the resistance, and I is the current. Typically, the charging device 10 is designed to account for the normal Iload 230, the Rload 232, and a normal resistance of the USB cable 20 that is in good condition to produce the appropriate Isource 203 at a given power dissipation level. The charging device 10 may be able to adjust the supply voltage 201 and/or Rsource 202 during charging of the mobile device to maintain an appropriate Iload 230 for charging of the mobile device 30.

The charging device 10 may have conventional overcurrent protection (not shown), which limits or cuts off the Isource 203 when the charging device 10 overheats. When the charging device 10 cools down the Isource 203 is raised back to the appropriate level. This could lead to the charging device 10 to oscillate the Isource 203 and cause false indications to a user of the mobile device 30. A limitation of conventional overcurrent protection is that the charging device 10 assumes that the charging environment does not change beyond the normal design parameters and that no unexpected and/or additional ohmic losses occur.

Unexpected ohmic losses can occur in the USB cable 20 in several areas. When there is a broken or bent line from VBUS pin on USB connector 21 to VBUS pin on USB connector 22, there would be an increased series loss referred to as Rloss1 213. Rloss1 213 would increase the effective load seen at the USB connector 13 of the charging device 10. The effective load would be Rloss1 213 plus Rload 232. Another similar unexpected ohmic loss can occur when there is broken or bent line from the GND pin on USB connector 21 to GND pin on USB connector 22, which would cause an increased series loss referred to as Rloss2 214. Rloss 214 would increase the effective load seen at the USB connector 13 of the charging device 10. In this instance, the effective load would be Rload 232 plus Rloss2 214.

Unexpected ohmic losses can occur at or in the USB connectors 21, 22 as represented as Rloss3 215 and Rloss4 216 respectively. The USB connectors 21, 22 could have a broken connector, broken printed wiring board (also called circuit board), or a broken cable end so that current at VBUS pin flows to ground GND. When this occurs, the effective load decreases seen at the USB connector 13 of the charging device 10. This type of ohmic loss is represented as resistances in parallel (e.g., 1/Rload+1/Rloss3). In addition, different combinations of ohmic losses could occur. For example, Rloss1 213 and Rloss3 215 could occur. In one embodiment, the current flows to the charging device's 10 or mobile device's 30 printed wiring board through the USB connector's 13, 31 shield to the printed wiring board's ground. When ohmic loss Rloss3 215 occurs, the USB connector 13, printed wiring board of the charging device 10, and/or components of the charging device 10 near the USB connector 13 may overheat. When ohmic loss Rloss4 216 occurs, the USB connector 31, printed wiring board of the mobile device 30, and/or components of the mobile device 30 may overheat. If the overheating caused by Rloss3 215 or Rloss4 216 continues, then severe overheating may occur causing possible damage or even a safety hazard.

Figure 3:
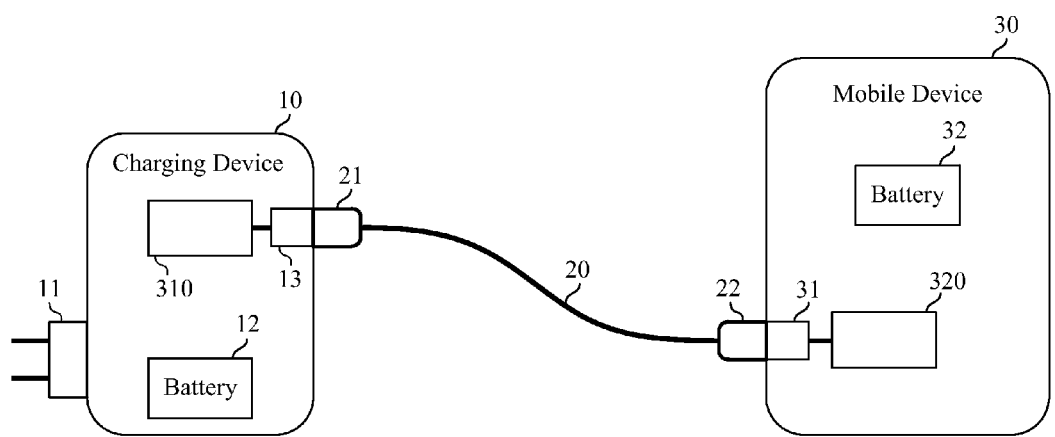
FIG. 3 is a block diagram of an example environment in which one embodiment of the invention may be implemented according to the principles of the present invention.

Turning now to FIG. 3 with continued reference to FIG. 1, illustrated is a block diagram of an example environment in which one embodiment of the invention may be implemented according to the principles of the present invention. In one embodiment of the invention, an apparatus 310 is coupled to the USB connector 13 of the charging device 10. In another embodiment of the present invention, the USB connector 13 is an USB type A receptacle as defined in Universal Serial Bus Micro-USB Cables and Connectors Specification, Revision 1.01, Apr. 4, 2007, and is hereby incorporated by reference in its entirety. In addition, the USB connector 13 of the charging device 10 would appear as a charging port. Background information concerning USB port descriptions and charging via USB is described in the Battery Charging Specification listed previously. In a related embodiment, the USB connector 13 of the charging device 10 would appear as a dedicated charging port.

The apparatus 310 is configured to sense overheating of the USB connector 13. In another embodiment, the apparatus 310 is configured to sense overheating of a printed wire board (also called a circuit board) (not shown) coupled the USB connector 13. The apparatus 310 may employ a sensing component to sense overheating, such as, a temperature sensor. In addition, the apparatus 310 is further configured to change a level of resistance between data lines of the USB connector 13 when the sensed overheating reaches a predetermined level. In one embodiment, the data lines are the D+ and D− pins of the USB connector 13 as illustrated in FIG. 2. In another embodiment, the apparatus 310 is further configured to increase the level of resistance between the data lines of the USB connector 13 when the sensed overheating reaches a predetermined level.

The increased level of resistance between the data lines results in the USB connector 13 to appear as a different type of port. USB port types are described by the USB standards previously included by reference. In one embodiment, the different type of port is a standard downstream port and has a specific level resistance between the D+ and D− pins of the USB connector 13. When the apparatus 310 causes the USB connector 13 to appear as a different type of port, the source current, such as Isource 203 of FIG. 2, used during charging will be reduced to a lower level associated with that type of port.

In one embodiment of the invention, an apparatus 320 is coupled to the USB connector 31 of the mobile device 30. The apparatus 320 is configured to sense overheating of the USB connector 31. In another embodiment, the apparatus 320 is configured to sense overheating of a printed wire board (also called a circuit board) (not shown) coupled the USB connector 31. The apparatus 320 may employ a sensing component to sense overheating, such as, a temperature sensor. In addition, the apparatus 320 is further configured to change a level of resistance between an identification line and a ground line of the USB connector 31 when the sensed overheating reaches a predetermined level. In one embodiment, the identification line and ground line are the ID and GND pins of the USB connector 31 as illustrated in FIG. 2. In another embodiment, the apparatus 320 is further configured to decrease a level of resistance between an identification line and a ground line of the USB connector 31 to a predetermined level when the sensed overheating reaches a predetermined level.

Figure 4:
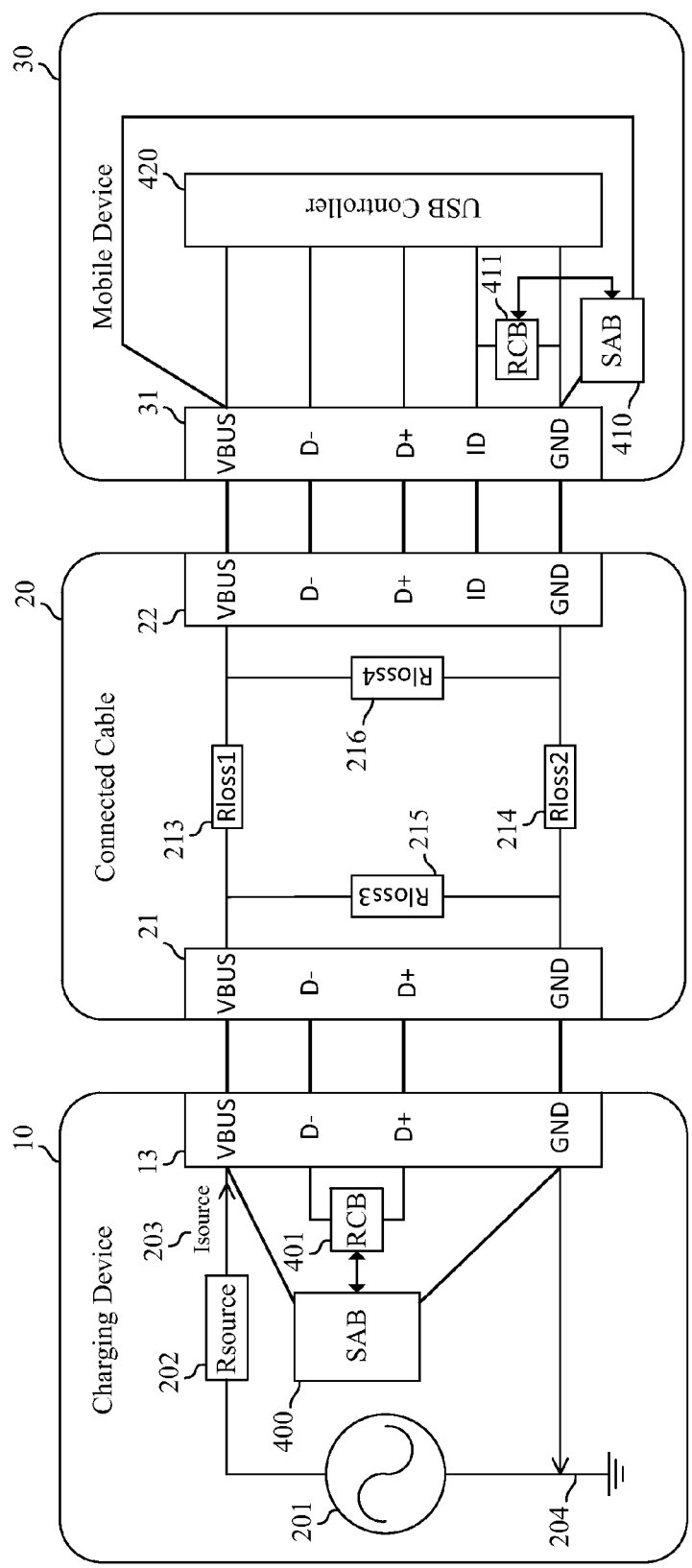
FIG. 4 is a block diagram of one embodiment of the invention of FIG. 3 in greater detail.

Turning now to FIG. 4, illustrated is a block diagram of the invention of FIG. 3 in more detail. In one embodiment, the apparatus 310 of FIG. 3 includes a sensing and adjustment block (SAB) 400 coupled to a resistive control block (RCB) 401. The sensing and adjustment control block 400 may in general comprise means for sensing a temperature and/or means for adjusting or controlling adjustment of a resistance. The resistive control block may in general comprise means for controlling or adjusting resistance, such as for example, increasing or decreasing resistance between data lines D+ and D−, as illustrated in FIG. 4.

The SAB 400 is coupled to the USB connector 13 in the charging device 10 and is configured sense overheating of the USB connector 13. In another embodiment, the SAB 400 is configured to sense overheating of a printed wire board (also called a circuit board) (not shown) coupled the USB connector 13. The SAB 400 may employ a sensing component to sense overheating, such as, a temperature sensor. In another embodiment, the SAB 400 is configured to sense overheating of the USB connector 13 and/or components (not shown) of the charging device 10 near the USB connector 13.

In one embodiment, the RCB 401 is coupled to data lines of the USB connector 13 and configured to change a level of resistance between the data lines. In another embodiment, the RCB 401 is coupled to the data lines coupled to the D+ and D− pins of the USB connector 13. In yet another embodiment, the RCB 401 includes a controllable resistor interposed the data lines on the D+ and D− pins of the USB connector 13. The controllable resistor may be a digital resistor or digital potentiometer that employs a digital signal or up/down signals to determine the resistance ratio used. Another type of controllable resistor may be a resistor of a predetermined value coupled to a switch, such as a transistor.

The SAB 400 is further configured to monitor the overheating and when the overheating reaches a predetermined level, the SAB 400 causing the RCB 401 to increase the level of resistance between the data lines. The increased level or resistance between the data lines results in the USB connector 13 to appear as a different type port. In one embodiment, the RCB 401 increases the level of resistance between the data lines to a level that is associated with a standard downstream port. In yet another embodiment, the SAB 400 and RCB 401 are configured to employ a thermistor to sense the level of overheating and to increase the level of resistance between the data lines.

In another embodiment of the present invention, the SAB 400 is coupled to the VBUS and GND pins of the USB connector 13 and configured to cause an interrupt on the voltage line coupled to the VBUS pin of the USB connector 13 when the SAB 400 senses a predetermined level of overheating. Interrupt on the voltage line includes dropping the voltage on the voltage line to or below a predetermined voltage level, waiting for a predetermined period of time and then restoring the voltage on the voltage line to a normal level. This is done with respect to ground 204. An interrupt on the voltage line coupled to the VBUS pin of the USB connector 13 will cause the mobile device 30, when coupled to the charging device 10 via the USB cable 20, to start a detection renegotiation to determine what type of USB port is connected to the mobile device 30.

An example of one possible operation of the present invention: when the charging device 10 is providing a source current Isource 203 to the mobile device 30, the USB connector 13 would appear as a dedicated charging port when mobile device 30 goes through its initial detection procedure. If an unexpected ohmic loss occurs, such as Rloss3 215, overheating could occur of the USB connector 13. When the SAB 400 senses that an overheating of the USB connector 13 reaches a predetermined level, the SAB 400 causes the RCB 401 to increase the level of resistance between the data lines, D+ and D−. The increased level of resistance on the data lines D+, D− results in the USB connector 13 to appear as a different type of port, such as a standard downstream port. In addition, the SAB 400 causes an interrupt on the voltage line coupled to the VBUS pin of the USB connector 13. This results in the mobile device 30 performing a detection renegotiation with the charging device 10. Once the mobile device 30 has finished the detection renegotiation, the mobile device 30 will operate as if it was connected to a standard downstream port instead of a dedicated charging port. When the mobile device 30 is connected to a standard downstream port, the level of source current Isource 203 is reduced and the level of overheating of the USB connector 13 is reduced.

In one embodiment of the present invention, the SAB 400 will continue monitoring the level of overheating of the USB connector 13, the printed wire board, and/or components near the USB connector 13. If the level of overheating is determined to be below the predetermined level of overheating, the SAB 400 will cause the RCB 401 to decrease the level of resistance between the data lines, D+ and D−. This will cause the USB connector 13 to appear as the original port type, such as the dedicated charging port. In another embodiment, the SAB 400 will also cause an interrupt on the voltage line coupled to the VBUS pin on the USB connector 13. When the USB connector 13 appears as the original port type to the mobile device 30, a higher level of source current Isource 203 can be supplied to the mobile device 30.

In another embodiment, if the SAB 400 detects that the level of overheating is severe, the SAB 400 can cause the voltage on the voltage line coupled to the VBUS pin of the USB connector 13 to drop to approximately zero. In a related embodiment, the SAB 400 may cause the voltage on the voltage line to drop to approximately zero by switching off the current Isource 203. This will result in the USB connector 13 appearing as an invalid USB port or no USB port when a detection renegotiation is performed by the mobile device 30.

In one embodiment, the apparatus 320 of FIG. 3 includes a sensing and adjustment block (SAB) 410 coupled to a resistive control block (RCB) 411. The SAB 410 is coupled to the USB connector 31 in the mobile device 30 and is configured sense overheating of the USB connector 31. In another embodiment, the SAB 410 is configured to sense overheating of a printed wire board (also called a circuit board) (not shown) coupled the USB connector 31. The SAB 410 may employ a sensing component to sense overheating, such as, a temperature sensor. In another embodiment, the SAB 410 is configured to sense overheating of USB connector 31 and/or components (not shown) of the mobile device 30 near the USB connector 31.

In one embodiment, the RCB 411 is coupled to an identification line and a ground line of the USB connector 31. In addition, the identification line and ground line of the USB connector 31 is coupled to a USB controller 420 embodied within the mobile device 30. In another embodiment, the RCB 411 is coupled to the identification line coupled to the ID pin of the USB connector 31 and the ground line coupled to the GND pin of the USB connector 31. The RCB 411 is configured to change a level of resistance between the identification line and ground line. In another embodiment, the RCB 411 includes a switch in series with a pull-down resistor interposed the identification line and ground line coupled to the ID and GND pins respectively of the USB connector 31. The RCB 411 decreases the level of resistance by closing the switch causing the pull-down resistor to be active. A benefit of at least one embodiment of the invention is that overheat protection in the mobile device 30 can be implemented without modifying the functionality of the USB controller 420.

The SAB 410 is further configured to monitor the overheating and when the overheating reaches a predetermined level, the SAB 410 causing the RCB 411 to decrease the level of resistance between the identification line and ground line. In one embodiment, the RCB 411 decreases the level of resistance between the identification line and the ground line to a predetermined level that indicates to the USB controller 420 that the mobile device 30 is a device type that is not capable of accepting a charging current via the VBUS pin of the USB connector 31. The GND pin of the USB connector 31 is also used to complete the circuit for charging. In yet another embodiment, the device type that is not capable of accepting a charging current is a USB On-The-Go A device type.

In another embodiment of the present invention, the SAB 410 is coupled to the VBUS and GND pins of the USB connector 31 and configured to cause an interrupt on the voltage line coupled to the VBUS pin of the USB connector 31 when the SAB 410 senses a predetermined level of overheating. Interrupt on the voltage line includes dropping the voltage on the voltage line to or below a predetermined voltage level, waiting for a predetermined period of time and then restoring the voltage on the voltage line to a normal level. This is done with respect to ground line on the GND pin of the USB connector 31. An interrupt on the voltage line coupled to the VBUS pin of the USB connector 31 will cause the mobile device 30 to start a detection renegotiation to determine what type of USB port is connected to the mobile device 30. In another embodiment, the SAB 410 may perform an interrupt on the voltage line on a periodic interval to start the detection renegotiation on the mobile device 30 during the charging of the mobile device 30. Performing periodic detection renegotiation during charging may assist in the mobile device 30 determining when the USB connector 13 of the charging device 10 appears as a different type of port.

The SAB 410, in another embodiment of the present invention, continues to monitor the level of overheating of the USB connector 31, the printed wire board, and/or components near the USB connector 31. If the level of overheating is determined to be below the predetermined level of overheating, the SAB 410 will cause the RCB 411 to increase the level of resistance between the identification line and ground line (ID, GND). This will indicate to the USB controller 420 that the mobile device 30 is a device type that is capable of accepting a charging current via the VBUS pin of the USB connector 31. In one embodiment, the device type that is capable of accepting a charging current is a USB On-The-Go B device type.

Figure 5A:
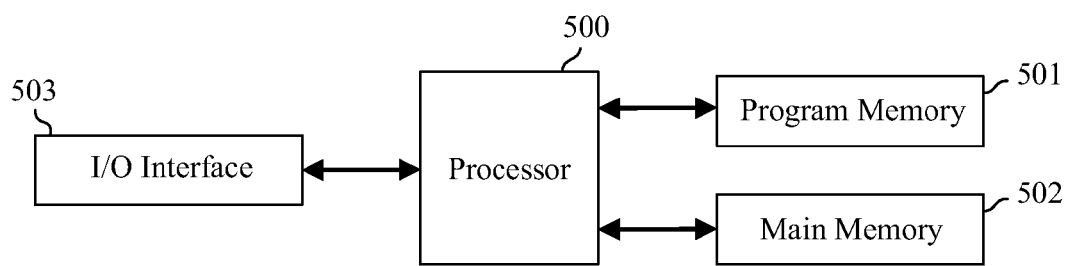
FIG. 5A is a block diagram of an embodiment of an apparatus within a charging device of FIG. 3.

Turning now to FIG. 5A with continued reference to FIG. 3, illustrated is a block diagram of an embodiment of an apparatus within a charging device 10 of FIG. 3 according to the principles of the present invention. The apparatus 310 of FIG. 3 comprises at least one processor 500 (only one processor is depicted in FIG. 5A), which may for instance be embodied as at least one microprocessor, at least one Digital Signal Processor (DSP), at least one Application Specific Integrated Circuit (ASIC), or at least one microcontroller to name but a few non-limiting examples. The at least one processor 500 executes program code stored in a program memory 501, and uses main memory 502 as a working memory, for instance to at least temporarily store intermediate results, but also to store for instance pre-defined and/or pre-computed databases. Some or all of memories 501 and 502 may also be included into the at least one processor 500. Memories 501 and/or 502 may for instance be embodied as Read-Only Memory (ROM), Random Access Memory (RAM), to name but a few non-limiting examples. One of or both of memories 501 and 502 may be fixedly connected to the at least one processor 500 or removable from the at least one processor 500, for instance in the form of a memory card or stick. In another embodiment, the at least one processor 500, the program memory 501, and the main memory 502 are part of the charging device 10 and at least a portion of the apparatus 310 may be embodied within at least a portion of the at least one processor 500, the program memory 501, and/or the main memory 502.

The at least one processor 500 further controls an input/output (I/O) interface 503. The I/O interface 503 is used by the at least one processor 500 to receive or provide information to other functional units. For instance, the I/O interface 503 might represent a parallel or serial interface comprising at least one data pin, a power pin and a ground pin. As an example, the I/O interface 503 might represent an interface being compatible with the Universal Serial Bus (USB), wherein, as a further example, the I/O interface 503 might be compatible with the USB charging port. In one embodiment, the I/O interface 503 might represent or comprise a connector (e.g. a receptacle) which is configured to be connected to a respective connector in order to connect the charging device 10 to the mobile device 30 via the USB cable 20. In yet another embodiment, the I/O interface 503 may be embodied within the at least one processor 500.

As will be described below, the at least one processor 500 is at least capable to execute program code for providing the any aspect of the invention. However, the at least one processor 500 may of course possess further capabilities. The at least one processor 500 may additionally or alternatively be capable of controlling operation of the charging device 10.

Figure 5B:
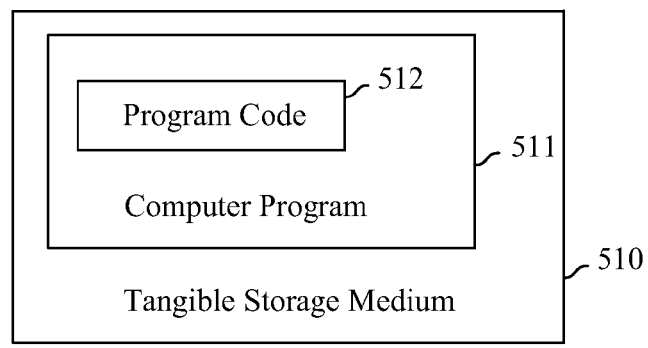
FIG. 5B is a schematic illustration of an embodiment of a tangible storage medium 410 according to the invention.

FIG. 5B is a schematic illustration of an embodiment of a tangible storage medium 510 according to the invention. This tangible storage medium 510, which may in particular be a non-transitory storage medium, comprises a computer program 511, which in turn comprises program code 512, which includes a set of instructions. Realizations of tangible storage medium 510 may for instance be program memory 501 of FIG. 5A. Consequently, program code 512 may for instance implement the flowchart of FIG. 6 associated with an aspect of the invention discussed below.

Figure 5C:
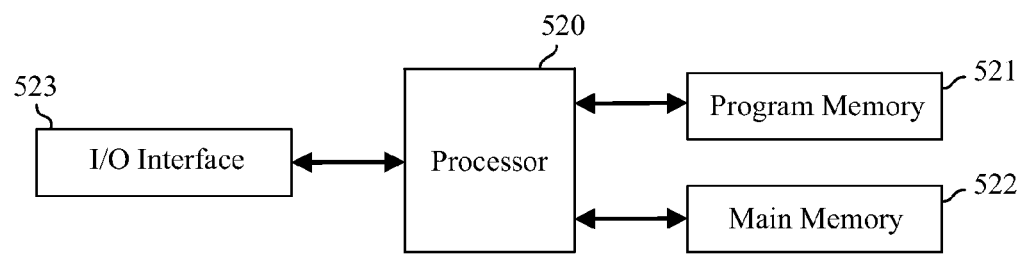
FIG. 5C is a block diagram on an embodiment of an apparatus with a mobile device of FIG. 3.

Turning now to FIG. 5C with continued reference to FIG. 3, illustrated is a block diagram of an embodiment of an apparatus within a mobile device 30 of FIG. 3 according to the principles of the present invention. The apparatus 320 of FIG. 3 comprises at least one processor 520 (only one processor is depicted in FIG. 5C), which may for instance be embodied as at least one microprocessor, at least one Digital Signal Processor (DSP), at least one Application Specific Integrated Circuit (ASIC), or at least one microcontroller, to name but a few non-limiting examples. The at least one processor 520 executes program code stored in a program memory 521, and uses main memory 522 as a working memory, for instance to at least temporarily store intermediate results, but also to store for instance pre-defined and/or pre-computed databases. Some or all of memories 521 and 522 may also be included into the at least one processor 520. Memories 521 and/or 522 may for instance be embodied as Read-Only Memory (ROM), Random Access Memory (RAM), to name but a few non-limiting examples. One of or both of memories 521 and 522 may be fixedly connected to the at least one processor 520 or removable from the at least one processor 520, for instance in the form of a memory card or stick. In another embodiment, the at least one processor 520, the program memory 521, and the main memory 522 are part of the mobile device 30 and at least a portion of the apparatus 320 may be embodied within at least a portion of the at least one processor 520, the program memory 521, and/or the main memory 522.

The at least one processor 520 further controls an input/output (I/O) interface 523. The I/O interface 523 is used by the at least one processor 520 to receive or provide information to other functional units. For instance, the I/O interface 523 might represent a parallel or serial interface comprising an identification pin and at least one data pin. As an example, the identification pin might be used for device role (host/device) identification purposed. It has to be understood that the I/O interface 523 might for instance comprise further pins, e.g. a power pin and a ground pin. As an example, the I/O interface 523 might represent an interface being compatible with the Universal Serial Bus (USB), such as a USB controller. In a further example, the I/O interface 523 might be compatible with the USB On The Go (OTG) standard. In one embodiment, the I/O interface 523 might represent or comprise a connector (e.g. a receptacle) which is configured to be connected to a respective connector in order to connect the mobile device 30 to the charging device 10 via the USB cable 20. In another embodiment, the I/O interface 523 may be embodied with the at least one processor 520.

As will be described below, the at least one processor 520 is at least capable to execute program code for providing the any aspect of the invention. However, the at least one processor 520 may possess further capabilities. Processor 520 may additionally or alternatively be configured to or capable of controlling the operation of the mobile device 30.

Figure 5D:
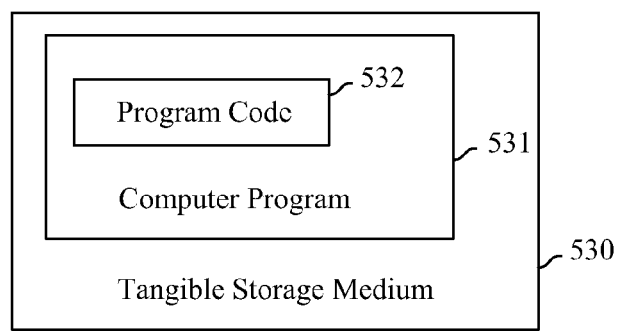
FIG. 5D is a schematic illustration of an embodiment of a tangible storage medium 430 according to the invention.

Turning now to FIG. 5D is a schematic illustration of an embodiment of a tangible storage medium 530 according to the invention. This tangible storage medium 530, which may in particular be a non-transitory storage medium, comprises a computer program 531, which in turn comprises program code 532, which includes a set of instructions. Realizations of tangible storage medium 510 may for instance be program memory 521 of FIG. 5C. Consequently, program code 532 may for instance implement the flowchart of FIG. 7 associated with an aspect of the invention discussed below.

Figure 6A:
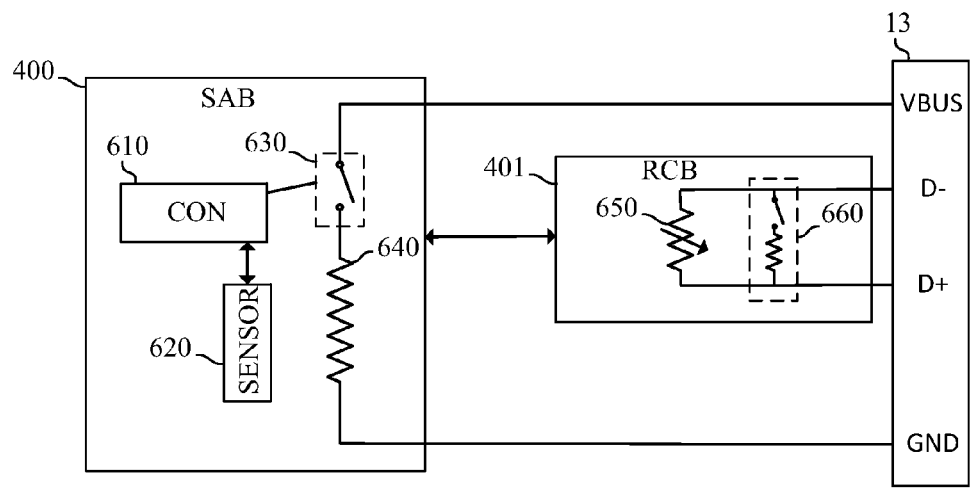
FIG. 6A is a schematic illustration of an embodiment of the present invention.

Turning now to FIG. 6A with continued reference to FIG. 4, is a schematic illustration of an embodiment of the present invention. In one embodiment, the SAB 400 of FIG. 4 includes a controller 610 coupled to a temperature sensor 620. The temperature sensor 620 may be located within or near the USB connector 13, or on a printed wire board coupled to the USB connector 13. In another embodiment, the temperature sensor 620 may be part of the controller 610. The controller 610 may be a microcontroller programmed to communicate with the temperature sensor 620 to sense a level of overheating of the USB connector 13. In one embodiment, the controller 610 may the processor 500, program memory 501, main memory 502 and I/O interface 503 of FIG. 5A. In another embodiment, the controller 610 may be the processor of the charging device 10. In yet another embodiment, the controller 610 may be part of charger switcher controller chip (e.g., flyback controller).

The controller 610 determines if the level of overheating reaches a predetermined level of overheating and then causes the RCB 401 to increase a level of resistance between a first and second data lines coupled to the USB connector 13. In another embodiment, the controller 610 may be a comparator that determines when the level of overheating reaches the predetermined level of overheating and causes the RCB 401 to increase the level of resistance between the first and second data lines. In addition, the controller 610 can cause an interrupt on the voltage line coupled to the USB connector 13. See FIG. 4 for a description of the interrupt on the voltage line. The controller 610, in one embodiment, controls a switch 630 to cause the voltage line to be coupled to a resistor 640 that is coupled to ground, which causes the voltage on the voltage line to drop. After a predetermined period of time, the controller 610 controls the switch 630 to open causing the voltage on the voltage line to rise. The switch 630 may be a transistor or field effect transistor. In another embodiment, the switch 630 may be internal to the controller 610. In yet another embodiment, the resistor 640 is not required.

In one embodiment, the RCB 401 of FIG. 4 includes a controllable resistor 650 used to change the level of resistance between the first and second data lines coupled to the USB connector 13. The controllable resistor 650 may be a digital resistor or digital potentiometer that employs a digital signal or up/down signals to determine the resistance ratio to be applied. In one embodiment, the RCB 401 increases the level of resistance of the controllable resistor 650 to a level that is associated with a standard downstream port. In an alternate embodiment, the RCB 401 includes the controllable resistor 660, which uses a resistor of a predetermined value coupled to a switch or alternatively a transistor having predetermined impedances interposed the first and second data lines.

Figure 6B:
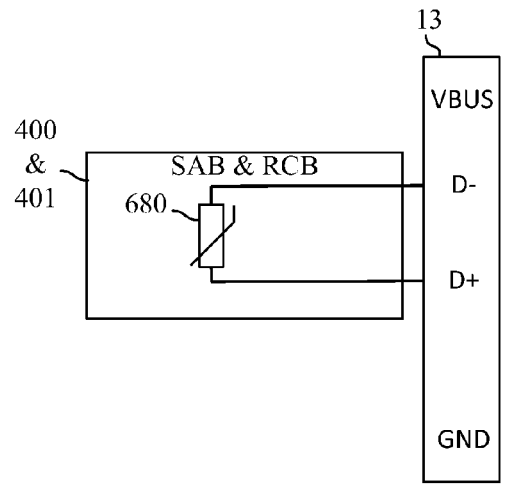
FIG. 6B is a schematic illustration of another embodiment of the present invention.

Turning now to FIG. 6B with continued reference to FIG. 4, is a schematic illustration of another embodiment of the present invention. The SAB 400 and RCB 401 of FIG. 4 are configured to employ a thermistor 680 to sense the predetermined level of overheating and to increase the level of resistance between the first and second data lines coupled to the USB connector 13. The thermistor 680 may be positive temperature coefficient thermistor having a predetermined resistance range that increases resistance as the sensed temperature increases. In one embodiment, the thermistor 680 has a predetermined resistance range that includes a level of resistance that is associated with a standard downstream port.

Figure 7:
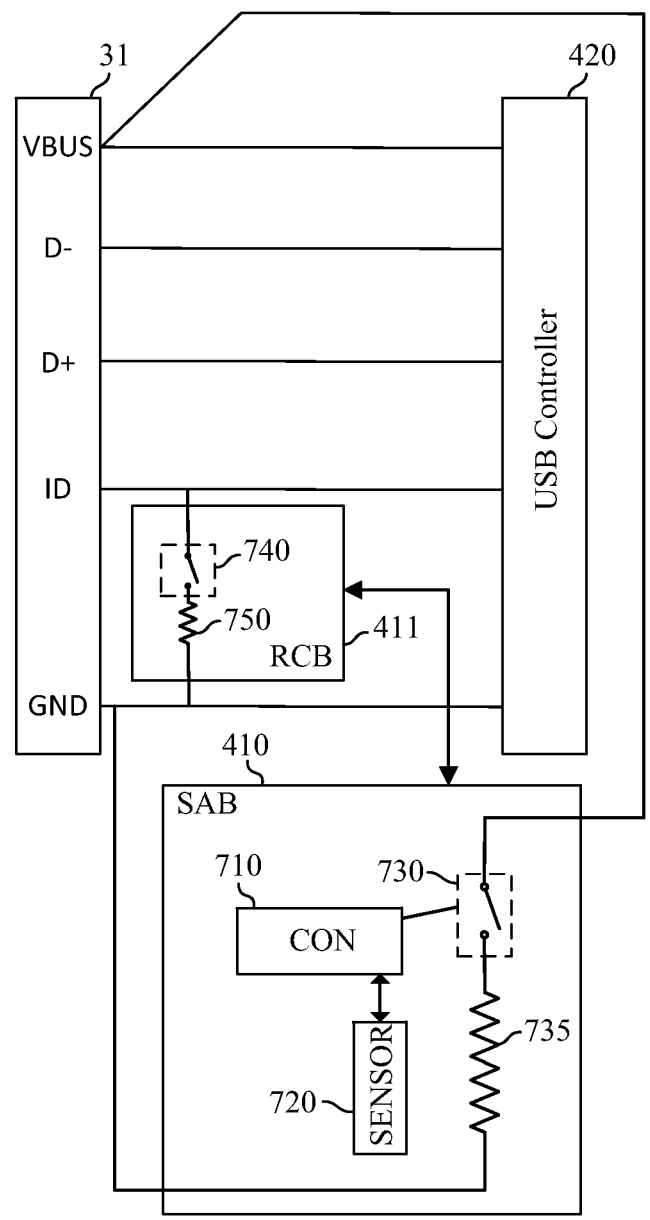
FIG. 7 is a schematic illustration of an embodiment of the present invention.

Turning now to FIG. 7 with continued reference to FIG. 4, is a schematic illustration of an embodiment of the present invention. In one embodiment, the SAB 410 of FIG. 4 includes a controller 710 coupled to a temperature sensor 720. The temperature sensor 720 may be located within or near the USB connector 31, or on a printed wire board coupled to the USB connector 31. In another embodiment, the temperature sensor 720 may be part of the controller 710. The controller 710 may be a microcontroller programmed to communicate with the temperature sensor 720 to sense a level of overheating of the USB connector 31. In one embodiment, the controller 710 may the processor 520, program memory 521, main memory 522 and I/O interface 523 of FIG. 5C. In another embodiment, the controller 710 may be the processor of the mobile device 30.

The controller 710 determines if the level of overheating reaches a predetermined level of overheating and then causes the RCB 411 to decrease a level of resistance between an identification line and a ground line coupled to the USB connector 31. In addition, the other end of the identification line and ground line are coupled to the USB controller 420. In another embodiment, the controller 710 may be a comparator that determines when the level of overheating reaches the predetermined level of overheating and causes the RCB 411 to decrease the level of resistance between the identification line and ground line couple to the USB connector 31. In addition, the controller 710 can cause an interrupt on the voltage line coupled to the USB connector 31. See FIG. 4 for a description of the interrupt on the voltage line. The controller 710, in one embodiment, controls a switch 730 to cause the voltage line to be coupled to a resistor 735 that is coupled to ground, which causes the voltage on the voltage line to drop. After a predetermined period of time, the controller 710 controls the switch 730 to open causing the voltage on the voltage line to rise. The switch 730 may be a transistor or field effect transistor. In another embodiment, the switch 730 may be internal to the controller 710. In yet another embodiment, the resistor 735 is not required. In yet another embodiment, the controller 710, switch 730, resistor 735, or a combination thereof may be embodied within the USB controller 420.

In one embodiment, the RCB 411 of FIG. 4 includes a switch 740 in series with a pull-down resistor 750 that are interposed the identification line and ground line. The switch may be a transistor or a field effect transistor. In another embodiment, the switch 740 may be internal to the controller 710. The switch 740 and pull-down resistor 750 are used to change the level of resistance between the identification line and ground line coupled to the USB connector 31. In a related embodiment, the switch 740 and pull-down resistor 750 are used to decrease the level of resistance to a predetermined level to indicate to the USB controller 420 that the mobile device is a device type that is not capable of accepting a charging current via the USB connector 31. In yet another embodiment, the switch 740 and pull-down resistor 750 may be replaced with a transistor or field effect transistor having predetermined impedances to cause the resistance the level of resistance between the identification line and the ground line to a level that indicates to the USB controller 420 that the mobile device 30 is a device type that is not capable of accepting a charging current via the VBUS pin of the USB connector 31. In another embodiment, a digital resistor or digital potentiometer could be used instead of the switch 740 and the resistor 750.

Figure 8A:
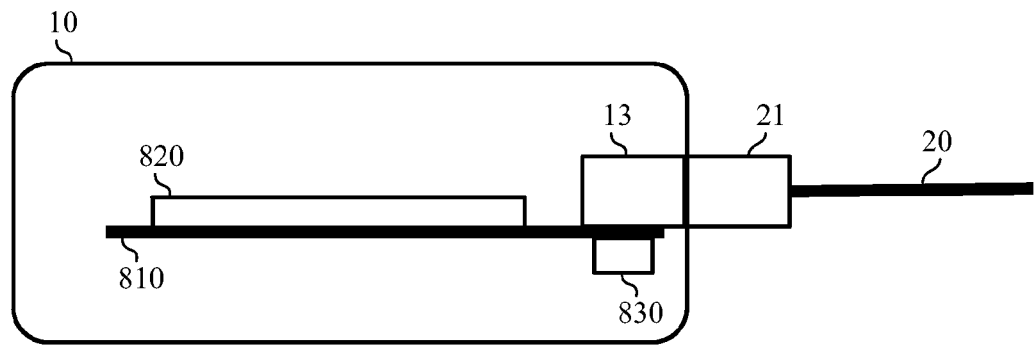
FIG. 8A is block diagram of one placement of a sensor of FIG. 6A within the charging device of FIG. 3 according to one embodiment of the present invention.

Turning now to FIG. 8A, illustrated is a block diagram of one placement of a sensor of FIG. 6A within the charging device 10 of FIG. 3 according to one embodiment of the present invention. The charging device 10 includes a printed wire board 810 located within the charging device 10. Coupled to the printed wire board 810 is the USB connector 13. The USB connector 13 is coupled to the USB cable 20 via the compatible type USB connector 21 as described in FIG. 2. At least one component 820 is coupled to the printed wire board 810 and located near the USB connector 13. A sensor 830, which is similar to the sensor 620 described in FIG. 6A, is coupled to opposite side of the printed wire board 810 from the USB connector 13. The sensor 830 is further located within an area on the opposite side of the printed wire board 810 where the USB connector 13 is located. In the illustrated embodiment, the sensor 830 can sense the heating of the USB connector 13. In another embodiment, the sensor 830 is still located on the same side of the printed wire board 810, but located closer to the at least one component 820. In this embodiment, the sensor 830 can sense the heating of the USB connector 13, the printed wire board 810, the at least one component 820, or a combination thereof.

Figure 8B:
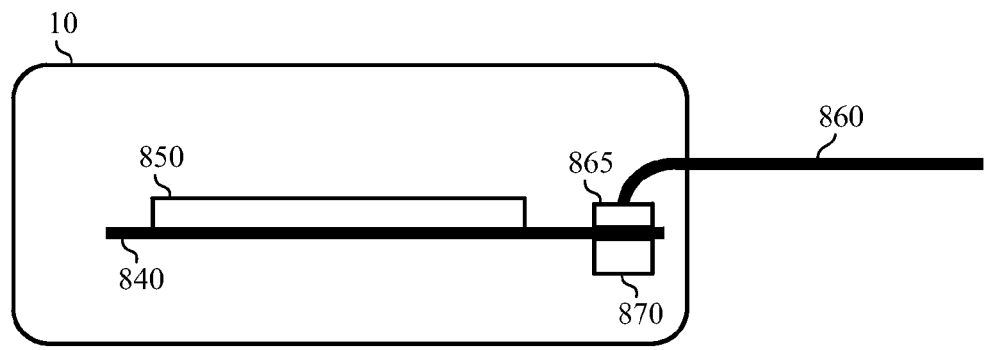
FIG. 8B is a block diagram of one placement of a sensor of FIG. 6A within a charging device of FIG. 3 with a captive cable according to one embodiment of the present invention.

Turning now to FIG. 8B is a block diagram of one placement of a sensor of FIG. 6A within a charging device 10 of FIG. 3 with a captive cable according to one embodiment of the present invention. The charging device 10 includes a printed wire board 840 located within the charging device 10. Coupled to the printed wire board 840 is a captive cable 860 via a connector 865. The captive cable 860 is similar to the USB cable 20 described in FIG. 2, except that there is no USB connector 21 coupled to the captive cable 860. In addition, the charging device 10 does not have a physical USB connector 13. The captive cable 860 is attached to the printed wire board 840 via the connector 865. In one embodiment, the connector 865 may be the wires of the USB cable couple directly to the printed wire board 840. In another embodiment, the connector 865 may be a non-standard USB connector that prevents the captive cable 860 from being removed from the charging device 10.

The charging device 10 further includes at least one component 850 coupled to the printed wire board 840 and located near the connector 865. A sensor 870 that is similar to the sensor 620 described in FIG. 6A is coupled to opposite side of the printed wire board 840 from the connector 865. The sensor 870 is further located within an area on the opposite side of the printed wire board 840 where the connector 865 is located. In the illustrated embodiment, the sensor 870 can sense the heating of the connector 865. In another embodiment, the sensor 870 is still located on the same side of the printed wire board 840, but located closer to the at least one component 850. In this embodiment, the sensor 870 can sense the heating of the connector 865, the printed wire board 840, the at least one component 850, or a combination thereof.

Figure 9:
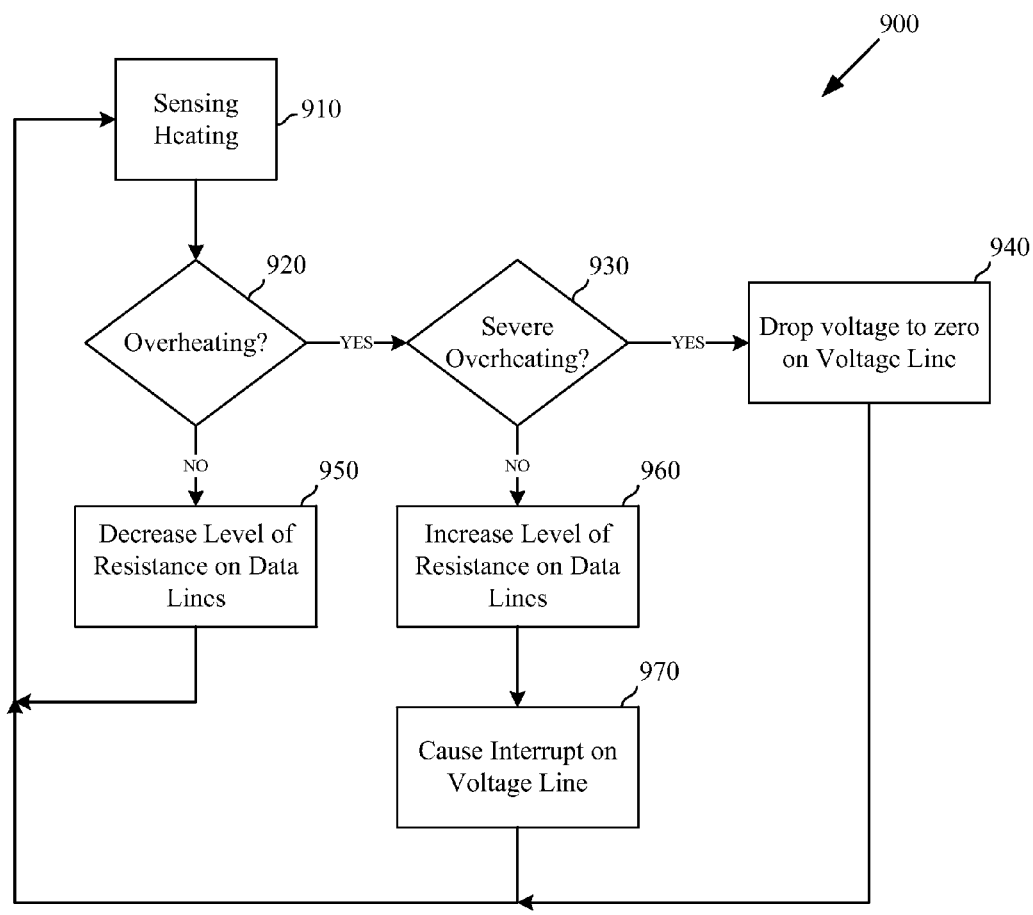
FIG. 9 is a flow diagram of one embodiment of a method according to the principles of the present invention.

Turning now to FIG. 9, illustrated is a flow diagram of one embodiment of a method of the present invention, generally designated 900, for use in a charging device with a USB connector conducted according to the principles of the present invention. See FIGS. 3 and 4 for description of the charging device and USB connectors. The method 900 performs some initialization and starts sensing the level of heating of a USB connector of a charging device in a step 910. In another embodiment, the step 910 perform sensing of a level of heating of the USB connector, printed wire board (also, called circuit board) coupled to the USB connector, and/or components near the USB connector. The method 900 then determines if the level of heating reaches a predetermined level of overheating in a decisional step 920.

If the method 900 determined that the predetermined level of overheating was reached in the decisional step 920, the method 900 then determines if the level of overheating is severe in a decisional step 930. If the level of overheating is severe, the method 900 drops the voltage on a voltage line coupled to the USB connector of the charging device to approximately zero in a step 940. Dropping the voltage on the voltage line to approximately zero would prevent any device, such as the mobile device of FIGS. 3 and 4, from recognizing the USB connector of the charging device as a valid USB port type. In an alternative embodiment, if the method 900 determined that the predetermined level of overheating was reached in the decisional step 920, the method 900 proceeds directly to a step 960. Next, the method 900 returns to continue sensing the level of heating in the step 910.

If the method 900 determined the level of overheating was not severe in the decisional step 930, the method 900 increases a level of resistance between a first and second data lines of the USB connector in the charging device in a step 960. Increasing the level of resistance between the first and second data lines of USB connector of the charging device causes the USB connector of the charging device to appear as a different type of port. In a related embodiment, the USB connector of the charging device would normally appear as a dedicated charging port and when the USB connector appears as a different type, it appears as a standard downstream port. See FIG. 4 for a description of the data lines and pins of the USB connector of the charging device. Background information concerning USB port descriptions is described in the Battery Charging specification listed previously.

In one embodiment, increasing the level of resistance includes increasing the level of resistance to a level associated with a USB standard downstream port. In another embodiment, the increasing the level of resistance includes controlling a controllable resistor interposed the first and second data lines of the USB connector of the charging device.

In one embodiment, the method 900 causes an interrupt on the voltage line coupled to the USB connector of the charging device in a step 970. Interrupt on the voltage line includes dropping the voltage on the voltage line to or below a predetermined voltage level, waiting for a predetermined period of time and then restoring the voltage on the voltage line to a normal level. An interrupt on the voltage line coupled to the USB connector will cause a device, which is coupled to the charging device via the USB connector, to start a detection renegotiation procedure to determine what type of USB port is the USB connector of the charging device. Next, the method 900 returns to continue sensing the level of heating in the step 910.

If the method 900 determined that the level of heating did not reach the predetermined level of overheating in the decisional step 920, the method 900 decreased the level of resistance between the first and second data lines of the USB connector in the charging device in a step 950. In one embodiment, the step 950 includes decreasing the level of resistance between the first and second data lines of the USB connector to a level associated with a dedicated charging port. In another embodiment, the step 950 includes decreasing the level of resistance if the level of resistance was previously increased. In another embodiment, the step 950 includes decreasing the level of resistance over a period of time. Decreasing the level of resistance between the first and second data lines to the original level in USB connector of the charging device causes the USB connector of the charging device to appear as the original port type. For example, the original port type may be a dedicated charging port. Next, the method 900 returns to continue sensing the level of heating in the step 910.

Figure 10:
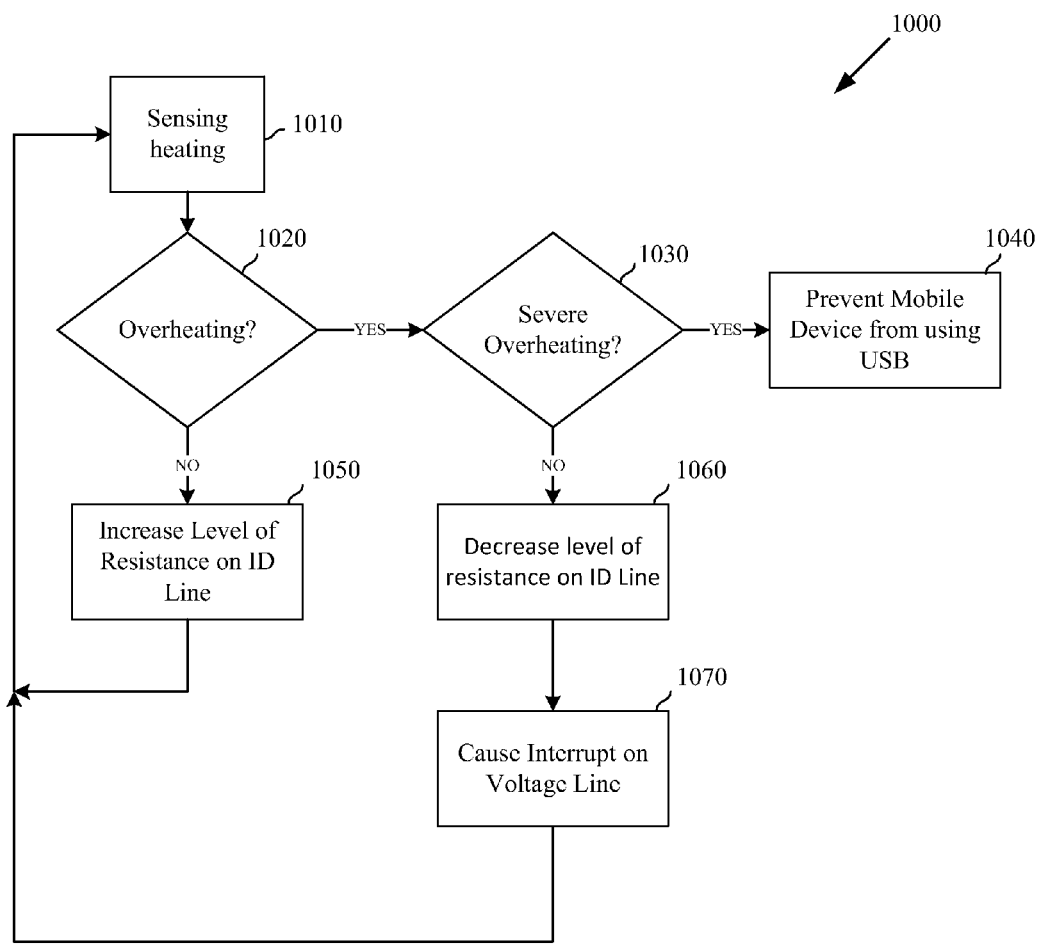
FIG. 10 is a flow diagram of another embodiment of a method according to the principles of the present invention.

Turning now to FIG. 10, illustrated is a flow diagram of one embodiment of a method of the present invention, generally designated 1000, for use in a mobile device with a USB controller coupled to a USB connector and conducted according to the principles of the present invention. See FIGS. 3 and 4 for description of the mobile device and USB connectors. The method 1000 performs some initialization and starts sensing the level of heating of a USB connector of a mobile device in a step 1010. In another embodiment, the step 1010 perform sensing of a level of heating of the USB connector, printed wire board (also, called circuit board) coupled to the USB connector, and/or components near the USB connector. The method 1000 then determines if the level of heating reaches a predetermined level of overheating in a decisional step 1020.

If the method 1000 determined that the predetermined level of overheating was reached in the decisional step 1020, the method 1000 then determines if the level of overheating is severe in a decisional step 1030. If the level of overheating is severe, the method 1000 prevents the mobile device from using the USB connector in a step 1040. In one embodiment, preventing the use of the USB connector includes informing a USB controller of the mobile device not to allow the USB connector to be used, or used for charging. In another embodiment, preventing the use of the USB connector includes decreasing a level of resistance between an identification line and a ground line of the USB connector in the mobile device. This results in an indication to the USB controller that the mobile device is a device type that is not capable of accepting a charging current via the USB connector. See FIG. 4 for a description of the data lines and pins of the USB connector of the mobile device. In yet another embodiment, preventing the use of the USB connector in the step 1040 may be temporary and further use of the USB connector may be allowed after a manual reset or after a predetermined period of time. In an alternative embodiment, if the method 1000 determined that the predetermined level of overheating was reached in the decisional step 1020, the method 1000 proceeds directly to a step 1060.

If the method 1000 determined the level of overheating was not severe in the decisional step 1030, the method 1000 decreases a level of resistance between an identification line and a ground line of the USB connector in the mobile device in a step 1060. In one embodiment, decreasing the level of resistance includes decreasing the level of resistance to a predetermined level to indicate to the USB controller that the mobile device is a device type that is not capable of accepting a charging current via the USB connector. In a related embodiment, the device type that is not capable of accepting a charging current is a USB On-The-Go A device. Background information concerning USB port descriptions and device types is described in the Battery Charging specification listed previously. In yet another embodiment of the present invention, the step 1060 of decreasing the level of resistance includes activating a pull-down resistor interposed the identification line and the ground line of the USB connector.

In one embodiment, the method 1000 causes an interrupt on the voltage line coupled to the USB connector of the mobile device in a step 1070. Interrupt on the voltage line includes dropping the voltage on the voltage line to or below a predetermined voltage level, waiting for a predetermined period of time and then restoring the voltage on the voltage line to a normal level. An interrupt on the voltage line coupled to the USB connector will cause the mobile device to start a detection renegotiation procedure to determine what type of USB port is coupled to the USB connector of the mobile device. Next, the method 1000 returns to continue sensing the level of heating in the step 1010.

If the method 1000 determined that the level of heating did not reach the predetermined level of overheating in the decisional step 1020, the method 1000 increases the level of resistance between the identification line and the ground line of the USB connector in the mobile device in a step 1050. In one embodiment, the step 1050 further includes increasing the level of resistance if the level of resistance was previously decreased. Increasing the level of resistance between the identification line and ground line to the original level results in an indication to the USB controller that the mobile device is a device type that is capable of accepting a charging current via its USB connector. Next, the method 1000 returns to continue sensing the level of heating in the step 1010.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

Those skilled in the art to which this application relates will appreciate that other and further additions, deletions, substitutions and modifications may be made to the described embodiments.

What is claimed is:

1. An apparatus comprising:
   a controllable resistor, coupled to a first data line and a second data line of a universal serial bus connector charging port, configured to change a level of resistance between said first data line and said second data line; and
   a sensing and adjustment block, coupled to said universal serial bus connector charging port and said controllable resistor, configured to sense a predetermined level of temperature of said universal serial bus connector charging port and cause said controllable resistor to increase said level of resistance resulting in said universal serial bus connector charging port to appear as a different type of port.

2. The apparatus of claim 1, wherein said controllable resistor increases said level of resistance to a level associated with a universal serial bus connector standard downstream port.

3. The apparatus of claim 1, wherein said sensing and adjustment block is further configured to cause an interrupt on a voltage line of said universal serial bus connector charging port when said predetermined level of temperature is sensed.

4. The apparatus of claim 1, wherein said sensing and adjustment block is further configured to sense a severe temperature level of said universal serial bus connector charging port and cause a voltage on a voltage line of said universal serial bus connector charging port to drop to approximately zero.

5. The apparatus of claim 1, wherein said sensing and adjusting block is further configured to employ a thermistor to sense said predetermined level of temperature and to cause said increase of said level of resistance.

6. The apparatus of claim 1, wherein said sensing and adjustment block includes a temperature sensor to sense said predetermined level of temperature.

7. An apparatus comprising:
   a controllable resistor coupled to a ground line and an identification line of a universal serial bus connector of a portable device, said identification line coupled to a universal serial bus controller of said portable device, wherein said controllable resistor is configured to change a level of resistance between said identification line and said ground line; and
   a sensing and adjustment block, coupled to said universal serial bus connector of said portable device and said controllable resistor, configured to sense a predetermined level of temperature of said universal serial bus connector of said portable device and cause said controllable resistor to decrease said level of resistance between said identification line and said ground line to a predetermined level that indicates to said universal serial bus controller that said portable device is of a device type that is not capable of accepting a charging current via said universal serial bus connector.

8. The apparatus of claim 7, wherein said controllable resistor comprises a switch and a pull-down resistor interposed said ground line and said identification line.

9. The apparatus of claim 7, wherein said sensing and adjustment block comprises a temperature sensor coupled to said universal serial bus connector of said portable device.

10. The apparatus of claim 7, wherein said sensing and adjustment block is further configured to cause an interrupt on a voltage line of said universal serial bus connector of said portable device when said predetermined level of temperature is sensed.

11. A method comprising:
    sensing, by a temperature sensor, a predetermined level of temperature of a universal serial bus connector charging port; and
    increasing a level of resistance of a controllable resistor interposed between a first data line and a second data line of a universal serial bus connector charging port in response to said sensing said predetermined level of temperature, and resulting in said universal serial bus connector charging port to appear as a different type of port.

12. The method of claim 11, wherein said increasing said level of resistance includes increasing said level of resistance of the controllable resistor to a level associated with a universal serial bus connector standard downstream port.

13. The method of claim 11, further comprises causing an interrupt on a voltage line of said universal serial bus connector charging port when said predetermined level of temperature is sensed.

14. The method of claim 11, further comprises sensing a severe temperature level of said universal serial bus connector charging port and causing a voltage on a voltage line of said universal serial bus connector charging port to drop to approximately zero.

15. A method comprising:
    sensing, by a temperature sensor, a predetermined level of temperature of a universal serial bus connector of a portable device; and
    changing a level of resistance of a controllable resistor interposed between an identification line and a ground line of said universal serial bus connector to a predetermined level of resistance in response to said sensing said predetermined level of temperature, wherein said identification line is coupled to a universal serial bus controller of said portable device wherein said predetermined level of resistance indicates to said universal serial bus controller that said portable device is a device type that is not capable of accepting a charging current via said universal serial bus connector.

16. The method of claim 15, wherein the controllable resistor comprises a pull-down resistor between said ground line and said identification line.

17. An apparatus comprising:
at least one processor; and
at least one memory including computer program code, said at least one memory and said computer program code configured to, with said at least one processor, cause said apparatus at least to perform:
sensing a predetermined level of temperature of a universal serial bus connector of said apparatus coupled to a universal serial bus controller of said apparatus; and
decreasing a level of resistance of a controllable resistor interposed between a ground line and an identification line of said universal serial bus connector to a predetermined level of resistance in response to said sensing said predetermined level of temperature, wherein said predetermined level of resistance indicates to said universal serial bus controller that said portable device is of a device type that is not capable of accepting a charging current via said universal serial bus connector.

18. An apparatus comprising:
at least one processor; and
at least one memory including computer program code, said at least one memory and said computer program code configured to, with said at least one processor, cause said apparatus at least to perform:
sensing a predetermined level of temperature of a universal serial bus connector of said apparatus; and
changing a level of resistance of a controllable resistor interposed between an identification line and a ground line of said universal serial bus connector to a predetermined level of resistance in response to said sensing said predetermined level of temperature, wherein said identification line is coupled to a universal serial bus controller of said apparatus, wherein said predetermined level of resistance indicates to said universal serial bus controller that said portable device is of a device type that is not capable of accepting a charging current via said universal serial bus connector.

* * * * *